United States Patent [19]

Ito et al.

[11] 4,349,088
[45] Sep. 14, 1982

[54] DEVICE FOR CONTROLLING A LOCK-UP CLUTCH IN AN AUTOMATIC TRANSMISSION WITH A LOCK-UP CLUTCH EQUIPPED FLUID TORQUE CONVERTER

[75] Inventors: Takayoshi Ito, Anjo; Seitoku Kubo; Yukio Terakura, both of Toyota, all of Japan

[73] Assignee: Aisin-Warner Kabushiki Kaisha, Anjo, Japan

[21] Appl. No.: 90,579

[22] Filed: Nov. 2, 1979

[30] Foreign Application Priority Data

Nov. 7, 1978 [JP] Japan .................. 53-137069

[51] Int. Cl.³ .................. F16H 47/04; F16H 47/06
[52] U.S. Cl. .................. 192/3.3; 74/731; 74/733; 74/752 C; 74/869; 192/3.57
[58] Field of Search .................. 192/3.25, 3.27, 3.28, 192/3.29, 3.3, 3.31, 3.52, 3.57, 103 R; 74/867, 868, 869, 865, 861, 740, 733, 732, 752 C, 645

[56] References Cited

U.S. PATENT DOCUMENTS

| | | | |
|---|---|---|---|
| 3,096,666 | 7/1963 | Christenson et al. | 74/867 X |
| 3,638,771 | 2/1972 | Chana | 192/3.52 X |
| 3,752,009 | 8/1973 | Chana | 74/645 |
| 3,857,302 | 12/1974 | Morris | 74/733 |
| 4,046,033 | 9/1977 | Hashimoto et al. | 74/645 X |
| 4,051,932 | 10/1977 | Aria et al. | 74/733 X |
| 4,095,486 | 6/1978 | Ohnuma | 74/733 X |
| 4,145,937 | 3/1979 | Shinoo et al. | 74/869 X |
| 4,148,232 | 4/1979 | Moriya | 74/867 X |

Primary Examiner—Leslie Braun
Assistant Examiner—Lawrence J. Gotts
Attorney, Agent, or Firm—Cooper, Dunham, Clark, Griffin & Moran

[57] ABSTRACT

A device for controlling a lock-up clutch in an automatic transmission having a lock-up clutch equipped fluid torque converter according to this invention comprises a transient release valve which receives pressurized input oil through a hydraulic passage connected to hydraulic servo means incorporated in the transmission, said transient release valve outputting pressured oil when the pressure of the input oil is higher than preset value, and a lock-up shift valve which receives the pressurized oil from the transient release valve, said lock-up shift valve being adapted for engaging the lock-up clutch when the output pressure is higher than a predetermined value and disengaging it when the pressure is lower than the predetermined value whereby the lock-up clutch is controlled by utilizing variations in hydraulic pressure supplied to the hydraulic servo means.

14 Claims, 4 Drawing Figures

DEVICE FOR CONTROLLING A LOCK-UP CLUTCH IN AN AUTOMATIC TRANSMISSION WITH A LOCK-UP CLUTCH EQUIPPED FLUID TORQUE CONVERTER

BACKGROUND OF THE INVENTION

1. Field of the Invention

The present invention relates to a device for controlling a lock-up clutch in an automatic transmission with a lock-up clutch equipped fluid torque converter and, more particularly, to a device for controlling the lock-up clutch by utilizing the hydraulic pressure supplied to the hydraulic servo means in the transmission.

2. Description of the Prior Art

In automatic transmissions equipped with torque converters having a lock-up clutch, the lock-up clutch is engaged at two different speed ranges and temporarily disengaged when the transmission is changed over between the two speed ranges in order to improve fuel consumption and alleviate shocks caused by the gear-shifting. In U.S. Pat. No. 4,095,486, it has been proposed to properly choose two pressure values based on transitional variation of the oil pressure supplied to the hydraulic servo means incorporated in the transmission so as to obtain the timing for disengaging the lock-up clutch temporarily. However, this U.S. Invention has a disadvantage that the valve structure is complicated.

SUMMARY OF THE INVENTION

It is an object of this invention to utilize hydraulic pressure variations in servo chambers to control the operation of the lock-up clutch in an automatic transmission which comprises a hydraulic torque converter with a lock-up clutch, a gear set with a hydraulic servo, and a hydraulic pressure control device.

Another object of the invention is to actuate the lock-up clutch only when the vehicle speed is higher than a predetermined value.

Still another object of this invention is to fully disengage the lock-up clutch when the transmission is shifted from 3rd to 4th speed and from 4th to 3rd speed.

To achieve the above objectives, the lock-up clutch controlling device according to this invention comprises a transient release valve which receives a hydraulic pressure from the hydraulic circuit and outputs a hydraulic pressure when the input pressure is higher than a predetermined value, and a lock-up shift valve which receives the hydraulic pressure from the transient release valve so as to engage the lock-up clutch when the output pressure is higher than a predetermined value, and disengage it when the pressure is lower than the predetermined value.

According to this invention, the lock-up clutch in a four-speed automatic transmission with an overdrive mechanism is disengaged at forward 1st and 2nd speed and engaged at 3rd and 4th speed to improve fuel consumption. Furthermore, in order to alleviate shocks caused by the gear-shifting, the transitional variation in hydraulic pressure supplied to the servo chambers during the gear-shifting between the 3rd and 4th speeds is utilized to temporarily disengage the lock-up clutch when the gear is being shifted from 3rd to 4th or from 4th to 3rd speed, and to engage it after the gear-shifting has been completed.

In addition, to ensure complete disengagement of the lock-up clutch during the gear-shifting between 3rd and 4th speeds, an orifice is provided to first and second oil passages that deliver pressurized oil to hydraulic servo chambers.

BRIEF DESCRIPTION OF THE DRAWINGS

In the accompanying drawings.

DESCRIPTION OF THE PREFERRED EMBODIMENT

Figure 1:
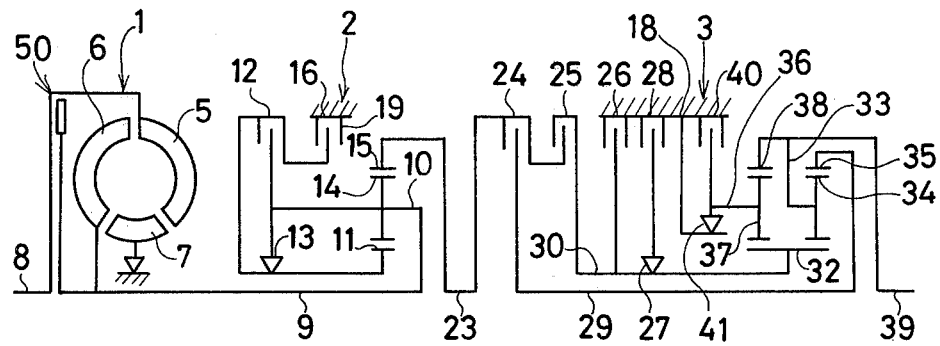
FIG. 1 is a diagrammatical view showing a power transmission mechanism in the automatic transmission in which the present invention is incorporated.

FIG. 1 is a schematic diagram of one embodiment of a fluid type automatic transmission with an overdrive mechanism. This automatic transmission includes a torque converter, an overdrive mechanism 2 and a gear set 3 with three forward drives and reverse drive. The torque converter 1 has a known construction comprising a pump 5, a turbine 6 and a stator 7, with the pump 5 connected with an engine crank shaft 8 and with the turbine 6 connected with a turbine shaft 9. The turbine shaft 9 constitutes an output shaft of the torque converter 1 as well as an input shaft of the overdrive mechanism 2, and is connected to a carrier 10 of a planetary gear set. Between the engine crank shaft 8 and the turbine shaft 9 is provided a lock-up clutch 50 which, when engaged, connects these shafts. A planetary pinion 14 rotatably supported on the carrier 10 is in mesh with a sun gear 11 and a ring gear 15. A multiple disc clutch 12 and a one-way clutch 13 are disposed between the sun gear 11 and the carrier 10. Provided between the sun gear 11 and a housing or an overdrive case 16 containing the overdrive mechanism is a multiple brake 19.

The ring gear 15 of the overdrive mechanism 2 is connected to an input shaft 23 of the gear set 3. The gear set 3 has a multiple disc clutch 24 provided between the input shaft 23 and an intermediate shaft 29. Between the input shaft 23 and the sun gear shaft 30 is arranged another multiple disc clutch 25. A multiple disc brake 28 is provided between the sun gear shaft 30 and the transmission case 18 via a multiple disc brake 26 and a one-way clutch 27. Together with a carrier 33, a planetary pinion 34 supported on the carrier 33, a ring gear 35 in mesh with the pinion 34, another carrier 36, another planetary pinion 37 supported on the carrier 36, and a ring gear 38 in mesh with the pinion 37, the sun gear 32 supported on the sun gear shaft 30 comprises two lines of planetary gear set. The carrier gear 33 in one of the planetary gear set is connected to the ring gear 38 in the other planetary gear set, and these carrier 33 and ring gear 38 are connected to the output shaft 39. Between the carrier 36 of the latter planetary gear set and the transmission case 18 are provided a multiple disc brake 40 and a one-way clutch 41. With clutches and brakes being engaged or disengaged, in accordance with the engine load and the vehicle speed, by the hydraulic pressure control device to be detailed hereinafter, the hydraulic transmission having the overdrive mechanism performs automatic gear-shifting of four-speed including the overdrive with the forward drives as well as reverse drive.

Table 1 shows the position of the transmission gear and operating condition of the clutches and brakes. In this table, a mark "1" represents the clutch or brake being engaged, and "0" indicates that they are in a disengaged condition.

at the R-position, the vehicle moves backward. The N-position means neutral. When the lever is set at the D-position, the transmission performs automatic gear-shifting of four-speed. When set at the 2-position, an automatic gear-shifting between forward 1st and 2nd speed is effected. When the lever is shifted to the L-position, the automatic gear-shifting will be locked and

TABLE 1

| Frictional components Shift position | | | Clutch 12 | Clutch 24 | Clutch 25 | Brake 19 | Brake 26 | Brake 28 | Brake 40 | One-way clutch 13 | One-way clutch 27 | One-way clutch 41 |
|---|---|---|---|---|---|---|---|---|---|---|---|---|
| Parking | | | 1 | 0 | 0 | 0 | 0 | 0 | 1 | | | |
| Reverse | | | 1 | 0 | 1 | 0 | 0 | 0 | 1 | Lock | Over-run | Lock |
| Neutral | | | 1 | 0 | 0 | 0 | 0 | 0 | 0 | | | |
| Forward drive | D-range | 1st | 1 | 1 | 0 | 0 | 0 | 0 | 0 | Lock | Lock | Lock |
| | | 2nd | 1 | 1 | 0 | 0 | 0 | 1 | 0 | Lock | Lock | Over-run |
| | | 3rd | 1 | 1 | 1 | 0 | 0 | 1 | 0 | Lock | Over-run | Over-run |
| | | O.D. | 0 | 1 | 1 | 1 | 0 | 1 | 0 | Over-run | Over-run | Over-run |
| | 2-range | 1st | 1 | 1 | 0 | 0 | 0 | 0 | 0 | Lock | Lock | Lock |
| | | 2nd | 1 | 1 | 0 | 0 | 1 | 1 | 0 | Lock | Lock | Over-run |
| | L-range | | 1 | 1 | 0 | 0 | 0 | 0 | 1 | Lock | Lock | Lock |

Figure 2:
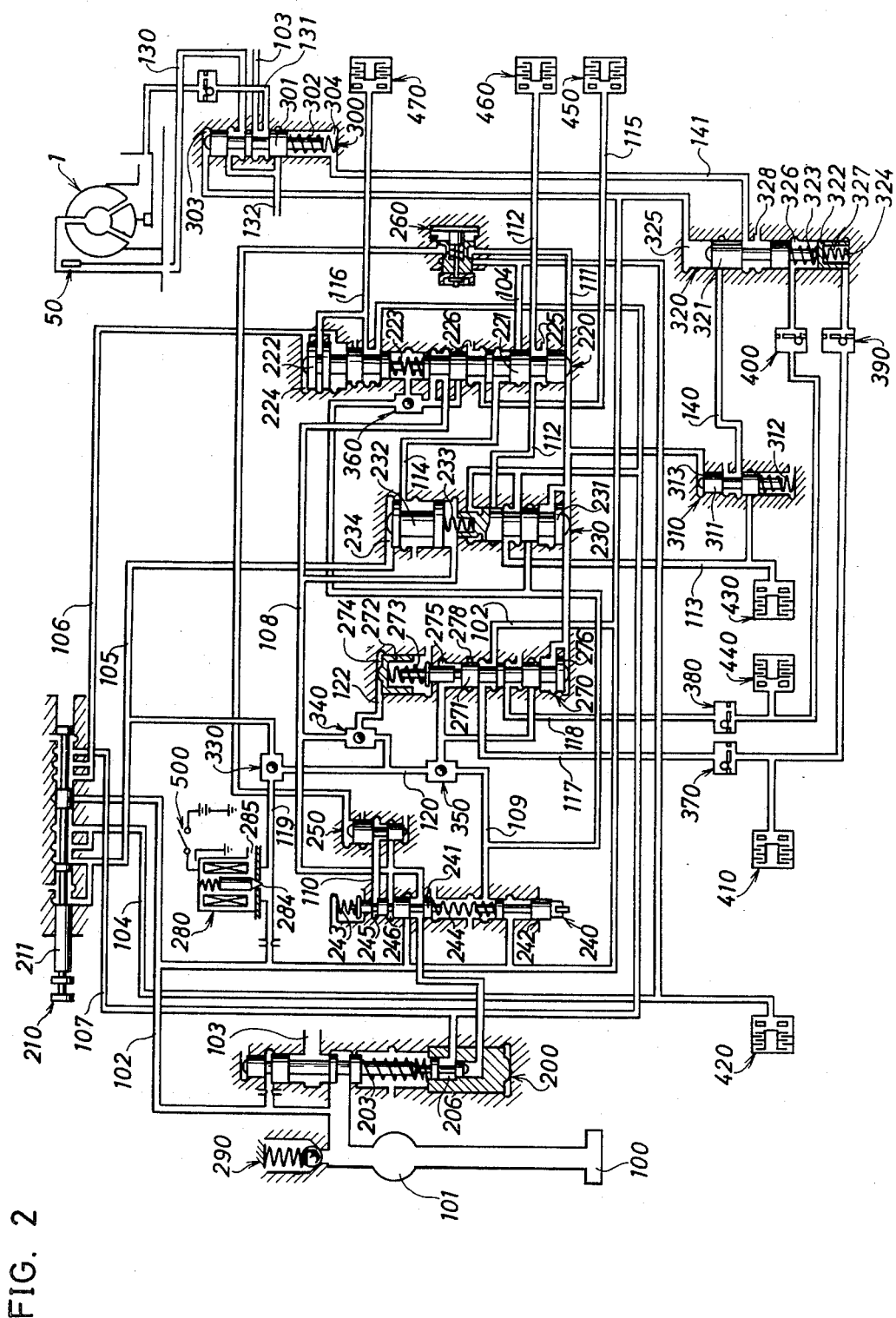
FIG. 2 is a diagram showing a hydraulic circuit as an embodiment of the control device according to the present invention.

FIG. 2 shows a hydraulic circuit of one embodiment of the hydraulic pressure control device according to this invention. This hydraulic pressure control device comprises an oil reservoir 100, a hydraulic pump 101, a pressure regulating valve 200, a manual valve 210, a 1-2 shift valve 220, a 2-3 shift valve 230, a throttle valve 240, a cutback valve 250, a governor valve 260, an overdrive shift valve 270, a solenoid valve 280, a relief valve 290, a lock-up shift valve 300, a governor control valve 310, a transient release valve 320, check valves 330, 340, 350, 360, 370, 380, 390, 400, clutches 12, 24, 25, brakes 19, 26, 28, 40, hydraulic cylinders 410, 420, 430, 440, 450, 460, 470 for actuating these clutches and brakes, and various oil passages interconnecting the above components.

The operation of the hydraulic control device will now be explained in the following. The actuating pressure for the hydraulic control device and the torque converter, and the lubricating oil are delivered by the pump 101 which is directly driven by the engine to suck up the oil in the oil reservoir 100 and deliver it to the passage 102. The oil pressure in the passage 102 is the source of all the actuating hydraulic pressure and is called a line pressure. The line pressure is regulated to a certain level by the pressure regulator valve 200 as will be described later. The relief valve 290 is to release the pressure when the line pressure becomes abnormally high. Oil that has passed through the pressure regulator valve 200 is supplied to the torque converter 1 and various other lubricating points from the passage 103.

The manual valve 210 has a spool 211 which is displaced by operating the shift lever provided at driver's seat, and according to the selected position of the shift lever the line pressure in the passage 102 is supplied into passages 104, 105, 106, 107, as shown in Table 2.

TABLE 2

| Shift position | Passage 104 | Passage 105 | Passage 106 | Passage 107 |
|---|---|---|---|---|
| R-position | 0 | 0 | 1 | 1 |
| N-position | 0 | 0 | 0 | 0 |
| D-position | 1 | 0 | 0 | 0 |
| 2-position | 1 | 1 | 0 | 0 |
| L-position | 1 | 1 | 1 | 0 |

In Table 2, a mark "1" indicates the line pressure is supplied to the passage concerned and "0" means the line pressure is not supplied. When the shift lever is set the transmission maintains the forward 1st speed.

When the shift lever is set at the D-position the line pressure is supplied from the passage 104 to the hydraulic cylinder 420 to engage the clutch 24. At the forward 1st, 2nd and 3rd speed, the clutch 12 is engaged. The passage 104 leads the line pressure to the 1-2 shift valve 220 as well as the governor valve 260. The 1-2 shift valve 220 consists of spools 221, 222 and a spring 223. At the 1st speed, the spool 221 is set at the lowest position and thereby blocks the flow of the pressurized oil from the passage 104. At the 2nd, 3rd and 4th speed, the governor pressure through the passage 111 causes the spool to move upward, supplying the line pressure from the passage 104 to the passage 112. The passage 112 is connected to the 2-3 shift valve 230 and also to the hydraulic cylinder 460 of the brake 28 which is actuated by applying hydraulic pressure to the cylinder 460. When the brake 28 is actuated, the power transmission operates in the 2nd speed, as shown in Table 1. The 2-3 shift valve 230 consists of spools 231, 232 and a spring 233. The spool 231 assumes the lowest position at the 1st and 2nd speeds. At the 3rd and 4th speeds, the governor pressure through the passage 111 causes the spool 231 to move upward thereby admitting the line pressure from the passage 112 into the passage 113 and further into the cylinder 430, which causes the clutch 25 to be engaged. When the clutch 25 is engaged, the transmission operated the 3rd speed, as shown in Table 1.

The overdrive shift valve 270 consists of a spool 271, a sleeve 272, a spring 273 and oil chambers 274, 275, 276, and is adapted to bring the passage 102 into communication with either passage 117 or 118 by the oil pressure applied to the chambers 274, 275, 276. The solenoid valve 280 is controlled by an overdrive switch 500 installed in the dashboard. When the overdrive switch 500 is turned off, an opening 284 is closed. The line pressure is then supplied from the passage 102 to the passage 119, the check valve 330, the passage 120, the check valve 340, passage 122 and into the chamber 274 of the overdrive shift valve 270, so that the spool 271 and the sleeve 272 are held in the lowest position.

When the overdrive switch 500 is put on, the opening 284 is opened. Then, the pressurized oil contained in the chamber 274 is allowed to flow back through the passage 122, the check valve 340, the passage 120, the check valve 330, the passage 119 and the opening 284, and exhausted from the discharge port 285. A throttle pressure is supplied to the chamber 274 through the passage 108, the check valve 340 and the passage 122, while a governor pressure is supplied to the chamber 276 via the passage 111. The movement of the spool 271 is controlled by these pressures supplied to the chambers of the overdrive shift valve 270.

When the overdrive switch 500 is put off, the line pressure of the passage 102 is applied to the chamber 274 of the overdrive shift valve 270 causing the spool 271 and the sleeve 272 to move downward, so that the line pressure in the passage 102 is supplied through the passage 117 and the check valve 370 to the hydraulic cylinder 410 of the clutch 12 to actuate the clutch 12.

When the overdrive switch 500 is put on, the throttle pressure is applied through the passage 108 to the chamber 274 of the overdrive shift valve 270. The spool 271 of the overdrive shift valve 270 is controlled by the hydraulic pressures applied to the chambers 274 and 276. At the 1st, 2nd and 3rd speed at which the governor pressure is small, the spool 271 assumes the lowest position and thereby supplied the line pressure of the passage 102 to the hydraulic cylinder 410 via the passage 117 and the check valve 370 to actuate the clutch 12.

When the spool 271 moves upward as the governor pressure increases, the passage 117 communicates to the drain port 278 to disengage the clutch 12, and at the same time the line pressure of the passage 102 is supplied to the hydraulic cylinder 440 of the brake 19 via the passage 118 and the check valve 380, thereby actuating the brake 19. The transmission operates in the 4th speed (i.e., at overdrive condition).

When the lever is shifted to the 2-position, the line pressure is supplied to the passages 104 and 105. The oil pressure admitted to the passage 105 is further led to the chamber 234 of the 2-3 shift valve 230 and causes the spools 231, 232 to move downward. At the same time, the line pressure in the passage 105 is also supplied to the chamber 274 of the overdrive shift valve 270 via the check valve 330, the passage 120, the check valve 340 and the passage 122, so that the spool 271 and the sleeve 272 are kept downward. The line pressure of the passage 104 is supplied to the hydraulic cylinder 420 of the clutch 24 and also to the 1-2 shift valve 220. When the 1-2 shift valve 220 is not in a position for the 1st speed, the line pressure of the passage 104 is supplied through the passage 112 to the hydraulic cylinder 460 to actuate the brake 28. At the same time, the line pressure of the passage 105 is supplied to the hydraulic cylinder 450 of the brake 26 via the 2-3 shift valve 230 and the passages 114, 115, thus actuating the brake 26. When the clutches 24, 12 and the brakes 26, 28 are actuated, the transmission operates in the 2nd speed, as shown in Table 1. When the 1-2 shift valve 220 assumes the position for the 1st speed, the spool 221 moves downward and the passage 112 communicates to the drain port 225 allowing the oil in the hydraulic cylinder 460 to be drained from the port 225 via the passage 112 and disengaging the brake 28. At the same time, the passage 115 communicates to the drain port 226, from which the oil in the hydraulic cylinder 450 is drained to release the brake 26. As a result, the transmission operates in the 1st speed, as shown in Table 1.

When the lever is shifted to the L-position, the line pressure is supplied to the passages 104, 105, 106. The line pressure led to the passage 104 actuates the clutch 24 as it does when the vehicle speed is at each speed of D-position shown in Table 1. The line pressure supplied into the passage 105 is led to the chamber 234 to hold the spools 231, 232 of the 2-3 shift valve 230 in a downward and, at the same time, holds the spool 271 and the sleeve 272 of the overdrive shift valve 270 in the lowest position. The line pressure admitted to the passage 106 is led to the oil chamber 224 of the 1-2 shift valve 220 to maintain the spools 221, 222 in the lowest position and also is led to the hydraulic cylinder 470 of the brake 40 thereby actuating the brake 40. Upon actuation of the clutches 24, 12 and the brake 40, the transmission operates in the first speed.

When the shift lever is set at the R-position, the line pressure is supplied to the passages 106 and 107. The line pressure in the passage 107 is further supplied to the oil chamber 206 of the pressure regulating valve 200 to increase the line pressure and also led to the passage 113 through the 2-3 shift valve 230 to actuate the clutch 25. The pressure in the passage 107 led the passage 116 via the 1-2 shift valve 220 to actuate the brake 40. The clutch 12 is also engaged. With the clutches 25, 12 and the brake 40 engaged, the transmission operates in the reverse drive.

The governor valve 260 is mounted to the output shaft 39 shown in FIG. 1. The governor valve 260 which is actuated by the resultant force among the centrifugal force, the spring force and the hydraulic pressure supplies to the passage 111 a hydraulic pressure (a governor pressure) that tends to increase in proportion to the rotating speed of the output shaft.

Consisting of a spool 241, a downshift plug 242, springs 243, 244 and oil chambers 245, 246, the throttle valve 240 supplies to the passage 108 a throttle pressure, a pressure which is proportional to the opening degree of a throttle at which the force of spring 244 and the hydraulic pressure supplied to the chambers 245, 246 balance each other. The force is generated in the spring 244 by the displacement of the downshift plug 242 interlocked with the accelerating pedal. The throttle pressure in the passage 108 is supplied to the 1-2 shift valve 220, the 2-3 shift valve 230 and the overdrive shift valve 270, so that the timing of gear-shifting is controlled according to the loading condition of the engine. When the accelerating pedal is strongly depressed to effect a kick-down, the downshift plut 242 moves up and thereby communicates the passage 102 with the passage 109, so that the line pressure of the passage 102 is delivered through the passage 109 to the 1-2 shift valve 220, the 2-3 shift valve 230, the check valve 350 and also to the overdrive shift valve 270, causing the transmission gear to be shifted from the 4th speed down to the 3rd, or from the 3rd to 2nd, or from 2nd to 1st, depending on the governor pressure acting upon the lower end of the spools 221, 231 271.

The cutback valve 250 produces a cutback pressure in the passage 110 by the pressure balance. The cutback pressure in the passage 110 acts upon the throttle valve 240 to lower the throttle pressure so as to prevent the power loss in the oil pump.

The pressure regulating valve 200 produces the line pressure in the passage 102 by the valance between the force of spring 203 and the hydraulic pressure.

The check valves 370, 380, 390, 400 each comprise a check ball, an orifice and a hole.

Now, we will explain the control circuit of the lock-up clutch 50 of the torque converter 1, subject to this invention.

The lock-up shift valve 300 comprises a spool 301, a spring 302, and oil chambers 303, 304, with the oil chamber 303 continuously applied the line pressure. When the line pressure is not present in the oil chamber 304, the spool 301 is held downward by the line pressure acting in the oil chamber 303, thereby communicating the passage 103 with the passage 130. The pressurized oil from the passage 103 flows to the passage 130 to disengage the lock-up clutch 50, circulates in the torque converter 1 and flows past the passage 131 to the passage 132 from which it is discharged. When the line pressure is applied to the oil chamber 304, the spool 301 moves upward by the force of the spring 302 and thereby communicates the passage 103 with the passage 131, with the result that the lock-up clutch 50 is actuated by the pressure supplied from the passage 103 to the passage 131.

The governor control valve 310 consists of a spool 311, a spring 312 and an oil chamber 313. When the governor pressure applied to the oil chamber 313 becomes lower than a predetermined level, the spool 311 moves upward by the force of the spring 312 blocking the passage 113. On the other hand, when the governor pressure becomes higher than the predetermined level, the spool 311 is held downward against the force of the spring 312 to connect the passage 113 to the passage 140.

The transient release valve 320 comprises spools 321, 322, springs 323, 324 and oil chambers 325, 326, 327 with the oil chamber 325 continuously applied the line pressure. The spring 323 is disposed in the oil chamber 326 between the spools 321 and 322, and the spring 324 in the oil chamber 327 of the spool 322. The oil chamber 327 communicates through the check valve 390 to the hydraulic circuit 117 for a direct drive, while the oil chamber 326 communicates through the check valve 400 to the hydraulic circuit 118 for an overdrive. When the oil chamber 326 or 327 is applied a pressure (line pressure) higher than a predetermined value, the spool 321 moves upward to connect the passage 140 with the passage 141. When the pressure in the oil chamber 326 or 327 falls below the predetermined level, the spool 321 moves downward by the line pressure continuously applied to the oil chamber 325, bringing the passage 141 out of communication with the passage 140 and into communication with the oil drain port 328.

Forward 1st and 2nd speed: No pressure is supplied to the passage 113 and therefore oil chamber 304 of the lock-up shift valve 300, so that the line pressure applied to the oil chamber 303 causes the spool 301 to move downward connecting the passage 103 and the passage 130. The hydraulic pressure is supplied from the passage 103 to the passage 130 whereby the lock-up clutch 50 of the torque converter 1 is disengaged. Then the hydraulic pressure circulates in the torque converter 1 and flows past the lock-up shift valve 300 to the passage 132 from which it is discharged. Thus, the lock-up clutch 50 remains disengaged at the forward 1st and 2nd speed.

Forward 3rd speed: As the vehicle speed increases in the 3rd speed and the spool 311 of the governor control valve 310 is shifted downward, the passage 113 communicates to the passage 140. The line pressure is supplied from the passage 117 into the oil chamber 327 of the transient release valve 320; hence the spool 321 assumes an upwardly shifted position to connect the passage 140 and the passage 141. As a result, the line pressure in the passage 113 is supplied through the passages 140 and 141 into the oil chamber 304 of the lock-up shift valve 300, with the result the spool 301 is held upward connecting the passage 103 to the passage 131 and engaging the lock-up clutch 50.

Figure 3:
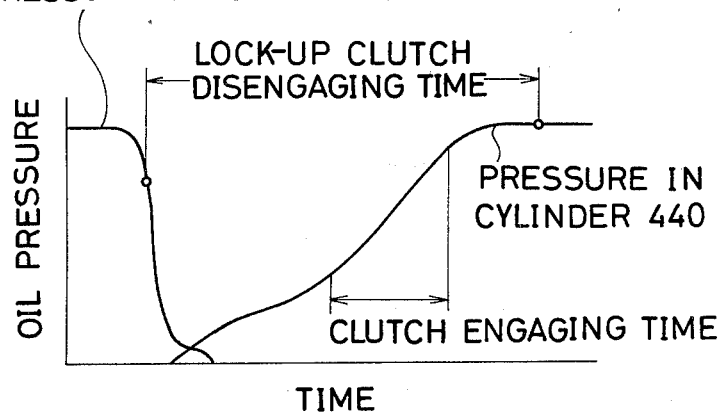
FIGS. 3 and 4 are graphs showing variations of oil pressure supplied to clutches and brakes during the gear-shifting between different speed ranges, the performance of the oil pressure representing the performance of accumulators.

3-4 upshift: As the vehicle speed increases from the 3rd speed (at which the lock-up clutch 50 is engaged) and the spool 271 of the overdrive shift valve 270 moves upward connecting the passage 102 to the passage 118 and also the passage 117 to the drain port 278, the hydraulic pressure in the hydraulic cylinder 410 of the clutch 12 is drained, as shown in FIG. 3, and the line pressure is gradually supplied to the cylinder 440 of the brake 19. At this time, the hydraulic pressure in these cylinders are varied such that the pressure in the cylinder 410 is quickly drained while the supply of pressure to the cylinder 440 is gradual, as shown in FIG. 3. At the same time, the pressure in the chamber 327 of the transient release valve 320 connected to the cylinder 410 through the passage 117 is quickly drained through the check valve 390 and the passage 117. Furthermore, the line pressure is gradually supplied through the passage 118 and the check valve 400 to the oil chamber 326 which is connected to the cylinder 440 through the passage 118.

When the pressure in the oil chamber 327 becomes lower than a predetermined level, the line pressure applied to the oil chamber 325 causes the spool 321 to move downward thus connecting the passage 141 to the oil drain port 328 from which the pressure in the oil chamber 304 of the lock-up shift valve 300 is drained. Upon drain of the pressure from the oil chamber 304, the spool 301 moves downward and thereby connects the passage 103 to the passage 130 so that the lock-up clutch 50 is disengaged.

When the pressure in the hydraulic cylinder 410 further falls releasing the clutch 12 and the pressure in the cylinder 440 increases engaging the brake 19, the upshift from the 3rd speed to the 4th speed is completed and the vehicle travels at the 4th speed.

When the pressure in the hydraulic cylinder 440 further increases until the spool 321 is moved upward by the action of the pressurized oil in the oil chamber 326, the passage 140 communicates to the passage 141 causing the spool 301 of the lock-up shift valve 300 to move upward so that the passage 103 is connected to the passage 131 and the lock-up clutch 50 engages again.

Figure 4:
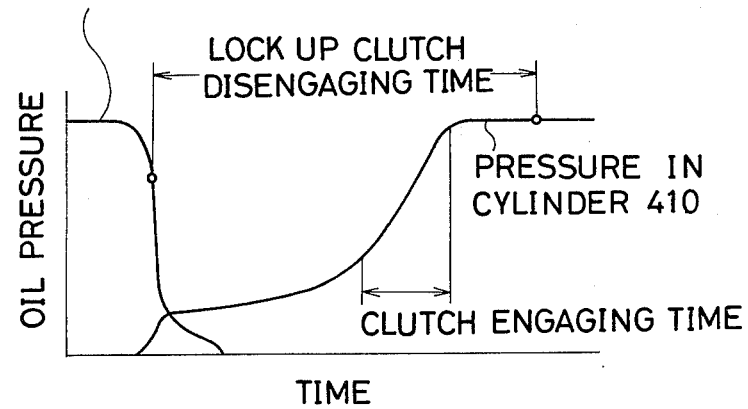

4-3 downshift: As the vehicle slows down from the forward 4th speed (the lock-up clutch 50 is engaged at this speed), the spool 271 of the overdrive shift valve 270 moves downward connecting the passage 118 to the oil drain port 279, and the passage 102 to the passage 117, with the result that the pressured oil in the cylinder 440 is drained and the line pressure is supplied to the cylinder 410, as shown in FIG. 4. As shown in FIG. 4, the pressure variation is such that the pressure in the cylinder 440 is quickly discharged through the check valve 380 and the line pressure is gradually applied to the cylinder 410. When the pressure in the oil chamber 326 connected to the cylinder 440 falls below a predetermined value, the spool 321 is displaced downward to connect the passage 141 to the oil drain port 328. This causes the spool 301 of the lock-up shift valve 300 to move downward, which in turn disengages the lock-up clutch 50.

When the pressure in the cylinder 440 further decrease releasing the brake 19 and the pressure in the cylinder 410 increases engaging the clutch 12, the downshift from the 4th speed to the 3rd speed is completed and the vehicle runs at the 3rd speed.

As the pressure in the hydraulic cylinder 410 becomes higher than the predetermined value, the spool 321 is shifted upward connecting the passage 140 with the passage 141, which causes the spool 301 of the lock-up shift valve 300 to move upward. As a result, the passage 103 communicates to the passage 131 thereby engaging the lock-up clutch 50 again. In other words, the downshift from the 4th speed to the 3rd speed is effected with the lock-up clutch 50 disengaged, and after the downshift is completed the lock-up clutch 50 is again engaged.

The check valves 390, 400 restrict the flow of pressurized oil from the hydraulic cylinders 410, 440 into the oil chambers 327, 326 of the transient release valve 320 and therefore delays the oil supply to these chambers, which in turn slows the upward movement of the spool 321 of the transient release valve 320. This ensures the complete disengagement of the lock-up clutch 50 and enables smooth gear-changing from 3rd to 4th and from 4th to 3rd speed.

We claim:

1. A device for controlling a lock-up clutch in a automatic transmission having a torque converter equipped with a lock-up clutch, comprising
    oil pressure passage means for supplying input oil pressure to hydraulic servo means;
    a transient release valve responsive to a balance between said input oil pressure and line pressure, said transient release valve delivering an output oil pressure when said input oil pressure is above a first predetermined value;
    and a lock-up shift valve responsive to a balance between said output oil pressure and line pressure, said lock-up shift valve adapted to engage said lock-up clutch when said output oil pressure is above a second predetermined value and to disengage said lock-up clutch when said output oil pressure is below said second predetermined value.

2. The device of claim 1 further comprising a governor control valve connected to said transient release valve, said governor control valve responsive to governor pressure which varies in accordance with the vehicle speed, said governor control valve opening to transmit oil pressure therethrough to said transient release valve when said governor pressure is above a third predetermined value.

3. The device of claim 2 wherein said transient release valve delivers the oil pressure transmitted by said governor control valve as output oil pressure to said lock-up shift valve when said input oil pressure is above said first predetermined value.

4. The device of claim 1 wherein said oil pressure passage means includes an orifice and said transient release valve is supplied with input oil pressure downstream of said orifice.

5. The device of claim 4 further comprising a check valve arranged in parallel with said orifice, said check valve restricting the rate at which input oil pressure is supplied to said hydraulic servo means and to said transient release valve.

6. The device of claim 5 further comprising a second orifice disposed between said hydraulic servo means and said transient release valve.

7. The device of claim 6 further comprising a second check valve arranged in parallel with said second orifice, said second check valve restricting the rate at which input oil pressure is supplied to said transient release valve.

8. The device of claim 1 wherein said oil pressure passage means comprises first and second oil passages which deliver input oil pressure to first and second hydraulic servo means and to first and second input ports of said transient release valve.

9. The device of claim 8 wherein said oil pressure passage means includes first and second orifices in said first and second oil passages and said transient release valve is supplied with input oil pressure downstream of said orifices.

10. The device of claim 9 further comprising first and second check valves arranged in parallel with said first and second orifices, said first and second check valves restricting the rate at which input oil pressure is supplied through said first and second oil passages to said hydraulic servo means and to said transient release valve.

11. The device of claim 10 further comprising a third orifice disposed in said first oil passage between said first hydraulic servo means and said transient release valve and a fourth orifice disposed in said second oil passage between said second hydraulic servo means and said transient release valve.

12. The device of claim 11 further comprising third and fourth check valves arranged in parallel with said third and fourth orifices, said third and fourth check valves restricting the rate at which input oil pressure is supplied through said first and second oil passages to said transient release valve.

13. The device of claim 8 wherein said automatic transmission includes a gear transmission which provides forward 1st, 2nd, 3rd, 4th and reverse speed ranges in accordance with engagement or disengagement of a plurality of hydraulic servo means, wherein said first oil passage is supplied with hydraulic pressure in 1st, 2nd, 3rd, and reverse speed ranges and is exhausted of hydraulic pressure in 4th speed range, and wherein said second oil passage is supplied with hydraulic pressure in 4th speed range and is exhausted of hydraulic pressure in 1st, 2nd, 3r, and reverse speed ranges.

14. The device of claim 8 or 13 wherein said transient release valve comprises:
    a housing;
    a first spool;
    a second spool having two lands of the same diameter;
    first, second, third, and fourth oil chambers, said first oil chamber formed by said first spool and said housing, said second oil chamber formed between said spools, said third oil chamber formed between the lands of said second spool, said fourth oil chamber formed by said second spool and said housing;
    first and second ports, said first port connecting said first oil passage with said first oil chamber, said second port connecting said second oil passage with said second oil chamber;
    a first spring located within said first oil chamber, said first spring biasing said first spool towards said second spool; and
    a second spring located within said second oil chamber, said second spring biasing said second spool towards said fourth oil chamber; wherein
    said fourth oil chamber is continuously supplied with line pressure and said third oil chamber is adapted to deliver the output oil pressure to said lock-up shift valve in response to movement of said second spool.

* * * * *